(12) United States Patent
Sampath et al.

(10) Patent No.: US 6,999,455 B2
(45) Date of Patent: Feb. 14, 2006

(54) HARDWARE ASSIST FOR ADDRESS LEARNING

(75) Inventors: Srinivas Sampath, Sunnyvale, CA (US); Mohan Kalkunte, Sunnyvale, CA (US)

(73) Assignee: Broadcom Corporation, Irvine, CA (US)

( * ) Notice: Subject to any disclaimer, the term of this patent is extended or adjusted under 35 U.S.C. 154(b) by 988 days.

(21) Appl. No.: 09/893,972

(22) Filed: Jun. 29, 2001

(65) Prior Publication Data

US 2002/0037006 A1   Mar. 28, 2002

Related U.S. Application Data

(60) Provisional application No. 60/220,805, filed on Jul. 25, 2000.

(51) Int. Cl.
 *H04L 12/28* (2006.01)
(52) U.S. Cl. .............. 370/392; 370/400; 370/401
(58) Field of Classification Search ........... 370/392, 370/395.31, 395.32, 422, 428, 432, 351, 370/360, 389, 390, 401–404
See application file for complete search history.

(56) References Cited

U.S. PATENT DOCUMENTS

| | | | |
|---|---|---|---|
| 5,136,580 A * | 8/1992 | Videlock et al. ............ 370/403 |
| 5,278,789 A | 1/1994 | Inoue et al. | |
| 5,390,173 A | 2/1995 | Spinney et al. | |
| 5,414,704 A | 5/1995 | Spinney | |
| 5,423,015 A | 6/1995 | Chung | |
| 5,459,717 A | 10/1995 | Mullan et al. | |
| 5,473,607 A | 12/1995 | Hausman et al. | |
| 5,499,295 A | 3/1996 | Cooper | |
| 5,524,254 A | 6/1996 | Morgan et al. | |
| 5,555,398 A | 9/1996 | Raman | |
| 5,568,477 A | 10/1996 | Galand et al. | |
| 5,579,301 A | 11/1996 | Ganson et al. | |
| 5,644,784 A | 7/1997 | Peek | |
| 5,652,579 A | 7/1997 | Yamada et al. | |
| 5,696,899 A | 12/1997 | Kalwitz | |
| 5,742,613 A | 4/1998 | MacDonald | |
| 5,748,631 A | 5/1998 | Bergantino et al. | |
| 5,781,549 A | 7/1998 | Dai | |
| 5,787,084 A | 7/1998 | Hoang et al. | |
| 5,790,539 A | 8/1998 | Chao et al. | |
| 5,802,047 A * | 9/1998 | Kinoshita ................ 370/359 |

(Continued)

FOREIGN PATENT DOCUMENTS

EP   0312917 A2   4/1989

(Continued)

OTHER PUBLICATIONS

"A High Speed CMOS Circuit for 1.2-Gb/s 16 x 16 ATM Switching," Alain Chemarin et al. 8107 IEEE Journal of Solid-State Circuits 27(1992) Jul., No. 7, New York, US, pp. 1116-1120.

(Continued)

*Primary Examiner*—Chau Nguyen
*Assistant Examiner*—Blanche Wong
(74) *Attorney, Agent, or Firm*—Squire, Sanders & Dempsey L.L.P.

(57) ABSTRACT

A switch using indicators for address learning. The switch has a first activator configured to control a first indicator to indicate when a source address needs to be learned and when a source address has been learned. A second activator is configured to control a second indicator to indicate when a destination address has not been learned and when a destination address has been learned. Finally, a third activator is configured to control a third indicator to indicate when a source address has not been learned in all switches.

17 Claims, 6 Drawing Sheets

| 30 | 28 | 26 | 24 | 22 | 20 | 18 | 16 | 14 | 12 | 10 | 8 | 6 | 4 | 2 | 0 |
|---|---|---|---|---|---|---|---|---|---|---|---|---|---|---|---|
| EH0 | R. | L | F | FTD | NB | Priority | PFM | Src_Port/SRC_TGID | | Src_Modid | | M | Egress Port | | Opcode/C |

| GRP | Module Id Bitmap |
|---|---|
| | Data |
| | CRC (Module Header + Data) |

U.S. PATENT DOCUMENTS

| | | | |
|---|---|---|---|
| 5,802,052 | A | 9/1998 | Venkataraman |
| 5,802,287 | A | 9/1998 | Rostoker et al. |
| 5,825,772 | A | 10/1998 | Dobbins et al. |
| 5,828,653 | A | 10/1998 | Goss |
| 5,831,980 | A | 11/1998 | Varma et al. |
| 5,842,038 | A | 11/1998 | Williams et al. |
| 5,845,081 | A | 12/1998 | Rangarajan et al. |
| 5,887,187 | A | 3/1999 | Rostoker et al. |
| 5,892,922 | A | 4/1999 | Lorenz |
| 5,898,687 | A | 4/1999 | Harriman et al. |
| 5,909,686 | A | 6/1999 | Muller et al. |
| 5,918,074 | A | 6/1999 | Wright et al. |
| 5,940,596 | A | 8/1999 | Rajan et al. |
| 5,959,976 | A * | 9/1999 | Kuo .................... 370/257 |
| 5,987,507 | A | 11/1999 | Creedon et al. |
| 6,011,795 | A | 1/2000 | Varghese et al. |
| 6,041,053 | A | 3/2000 | Douceur et al. |
| 6,061,351 | A | 5/2000 | Erimli et al. |
| 6,119,196 | A | 9/2000 | Muller et al. |
| 6,175,902 | B1 | 1/2001 | Runaldue et al. |
| 6,185,185 | B1 | 2/2001 | Bass et al. |
| 6,310,874 | B1 * | 10/2001 | Miller et al. ............... 370/379 |
| 6,310,876 | B1 * | 10/2001 | Egbert .................. 370/389 |
| 6,317,434 | B1 * | 11/2001 | Deng .................... 370/432 |
| 6,414,956 | B1 * | 7/2002 | Szczepanek ............... 370/392 |
| 6,480,488 | B1 * | 11/2002 | Huang .................. 370/389 |
| 6,553,028 | B1 * | 4/2003 | Tang et al. .............. 370/389 |
| 6,658,015 | B1 * | 12/2003 | Merchant et al. ........... 370/422 |
| 6,807,172 | B1 * | 10/2004 | Levenson et al. ........... 370/389 |

FOREIGN PATENT DOCUMENTS

| | | |
|---|---|---|
| EP | 0465090 A1 | 1/1992 |
| EP | 0752796 A2 | 1/1997 |
| EP | 08499178 A2 | 6/1998 |
| EP | 0853441 A2 | 7/1998 |
| EP | 0854606 A2 | 7/1998 |
| EP | 0859492 A2 | 8/1998 |
| EP | 0862349 A2 | 9/1998 |
| EP | 0907300 A2 | 4/1999 |
| FR | 2 725 573 A1 | 4/1996 |
| JP | 4-189023 | 7/1992 |
| WO | WO 98/09473 | 3/1998 |
| WO | WO 99/00938 | 1/1999 |
| WO | WO 99/00939 | 1/1999 |
| WO | WO 99/00944 | 1/1999 |
| WO | WO 99/00945 | 1/1999 |
| WO | WO 99/00948 | 1/1999 |
| WO | WO 99/00949 | 1/1999 |
| WO | WO 99/00950 | 1/1999 |
| WO | WO9900936 | 6/2001 |

OTHER PUBLICATIONS

"Local Area Network Switch Frame Lookup Technique for Increased Speed and Flexibility," 700 IBM Technical Disclosure Bulletin 38(1995) Jul., No. 7, Armonk, NY, US, pp. 221-222.

"Queue Management for Shared Buffer and Shared Multi-buffer ATM Switches," Yu-Sheng Lin et al., Departement of Electronics Engineering & Institute of Electronics, National Chiao Tung University, Hsinchu, Taiwan, R.O.C., Mar. 24, 1996, pp. 688-695.

"A 622-Mb/s 8 x 8 ATM Switch Chip Set with Shared Multibuffer Architecture," Harufusa Kondoh et al., 8107 IEEE Journal of Solid-State Circuits 28(1993) Jul., No. 7, New York, US, pp. 808-814.

"Catalyst 8500 CSR Architecture," White Paper XP-002151999, Cisco Systems Inc. 1998, pp. 1-19.

"Computer Networks," A.S. Tanenbaum, Prentice-Hall Int., USA, XP-002147300(1998), Sec. 5.2-Sec. 5.3, pp. 309-320.

* cited by examiner

| VLAN Id | MAC Address | Module | Port | ·········· | L_State |
|---------|-------------|--------|------|------------|---------|
|         |             |        |      |            |         |

HARDWARE ASSIST FOR ADDRESS LEARNING

REFERENCE TO RELATED APPLICATIONS

This application claims priority to U.S. Provisional Patent Application Ser. No. 60/220,805 filed on Jul. 25, 2000. The contents of the provisional application identified above is hereby incorporated by reference.

BACKGROUND OF THE INVENTION

1. Field of the Invention

The invention relates to a method and apparatus for high performance switching in local area communications networks such as token ring, ATM, ethernet, fast ethernet, and gigabit ethernet environments, generally known as LANs. In particular, the invention relates to a new switching architecture in an integrated, modular, single chip solution, which can be implemented on a semiconductor substrate such as a silicon chip.

2. Description of the Related Art

As computer performance has increased in recent years, the demands on computer networks has significantly increased; faster computer processors and higher memory capabilities need networks with high bandwidth capabilities to enable high speed transfer of significant amounts of data. The well-known ethernet technology, which is based upon numerous IEEE ethernet standards, is one example of computer networking technology which has been able to be modified and improved to remain a viable computing technology. A more complete discussion of prior art networking systems can be found, for example, in SWITCHED AND FAST ETHERNET, by Breyer and Riley (Ziff-Davis, 1996), and numerous IEEE publications relating to IEEE 802 standards. Based upon the Open Systems Interconnect (OSI) 7-layer reference model, network capabilities have grown through the development of repeaters, bridges, routers, and, more recently, "switches", which operate with various types of communication media. Thickwire, thinwire, twisted pair, and optical fiber are examples of media which has been used for computer networks. Switches, as they relate to computer networking and to ethernet, are hardware-based devices which control the flow of data packets or cells based upon destination address information which is available in each packet. A properly designed and implemented switch should be capable of receiving a packet and switching the packet to an appropriate output port at what is referred to wirespeed or linespeed, which is the maximum speed capability of the particular network. Basic ethernet wirespeed is up to 10 megabits per second, Fast Ethernet is up to 100 megabits per second, and Gigabit Ethernet is capable of transmitting data over a network at a rate of up to 1,000 megabits per second. The newest Ethernet is referred to as 10 Gigabit Ethernet and is capable of transmitting data over a network at a rate of up to 10,000 megabits per second. As speed has increased, design constraints and design requirements have become more and more complex with respect to following appropriate design and protocol rules and providing a low cost, commercially viable solution. For example, high speed switching requires high speed memory to provide appropriate buffering of packet data; conventional Dynamic Random Access Memory (DRAM) is relatively slow, and requires hardware-driven refresh. The speed of DRAMs, therefore, as buffer memory in network switching, results in valuable time being lost, and it becomes almost impossible to operate the switch or the network at linespeed. Furthermore, external CPU involvement should be avoided, since CPU involvement also makes it almost impossible to operate the switch at linespeed. Additionally, as network switches have become more and more complicated with respect to requiring rules tables and memory control, a complex multi-chip solution is necessary which requires logic circuitry, sometimes referred to as glue logic circuitry, to enable the various chips to communicate with each other. Additionally, cost/benefit tradeoffs are necessary with respect to expensive but fast SRAMs versus inexpensive but slow DRAMs. Additionally, DRAMs, by virtue of their dynamic nature, require refreshing of the memory contents in order to prevent losses thereof. SRAMs do not suffer from the refresh requirement, and have reduced operational overhead which compared to DRAMs such as elimination of page misses, etc. Although DRAMs have adequate speed when accessing locations on the same page, speed is reduced when other pages must be accessed.

Referring to the OSI 7-layer reference model discussed previously, the higher layers typically have more information. Various types of products are available for performing switching-related functions at various levels of the OSI model. Hubs or repeaters operate at layer one, and essentially copy and "broadcast" incoming data to a plurality of spokes of the hub. Layer two switching-related devices are typically referred to as multiport bridges, and are capable of bridging two separate networks. Bridges can build a table of forwarding rules based upon which MAC (media access controller) addresses exist on which ports of the bridge, and pass packets which are destined for an address which is located on an opposite side of the bridge. Bridges typically utilize what is known as the "spanning tree" algorithm to eliminate potential data loops; a data loop is a situation wherein a packet endlessly loops in a network looking for a particular address. The spanning tree algorithm defines a protocol for preventing data loops. Layer three switches, sometimes referred to as routers, can forward packets based upon the destination network address. Layer three switches are capable of learning addresses and maintaining tables thereof which correspond to port mappings. Processing speed for layer three switches can be improved by utilizing specialized high performance hardware, and off loading the host CPU so that instruction decisions do not delay packet forwarding.

SUMMARY OF THE INVENTION

The invention is directed to a switch using indicators for address learning. The switch has a first activator configured to control a first indicator to indicate when a source address needs to be learned and when a source address has been learned; a second activator configured to control a second indicator to indicate when a destination address has not been learned and when a destination address has been learned; and a third activator configured to control a third indicator to indicate when a source address has not been learned in all switches.

In another embodiment the invention is directed to a switch for address learning. The switch has a first indicator means for indicating when a source address needs to be learned and when a source address has been learned; a second indicator means for indicating when a destination address has not been learned and when a destination address has been learned; and a third indicator means for indicating when a source address has not been learned in all switches.

The invention is also directed to a method of address learning. The method has the steps of receiving a packet in a switch and performing a destination address lookup. An first indicator is set if there is a destination address lookup failure. A second indicator is set if the first indicator was set before the destination address lookup, there is no destination lookup failure, and the switch is the originating switch. A source address lookup is performed and third indicator is set if there is a source address lookup failure or if an L_State Bit is set. An address is learned if the third indicator is set.

BRIEF DESCRIPTION OF THE DRAWINGS

The objects and features of the invention will be more readily understood with reference to the following description and the attached drawings, wherein.

DETAILED DESCRIPTION OF THE PREFERRED EMBODIMENTS

Figure 1:
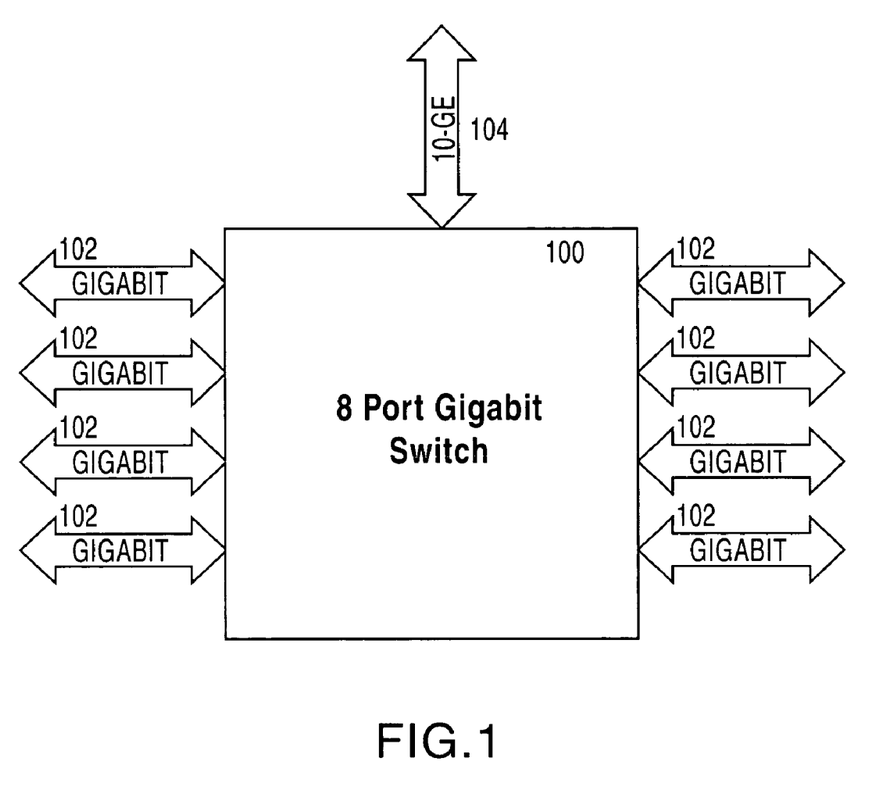
FIG. 1 is an illustration of an eight port gigabit switch having a 10 gigabit Ethernet interface.

FIG. 1 is an illustration of a port gigabit switch (pGS) 100. In this example, pGS 100 has eight gigabit ports 102 and a 10-GE (Gigabit Ethernet) Interface 104, but it will be understood that other configurations are within the scope of the invention.

pGS 100 is a Layer 2 device with on-chip Media Access Control (MAC) address tables and a Fast Filtering Processor (FFP). The device can operate in standalone mode or can be connected to other devices including other pGS devices. pGS 100 is a single chip non-blocking switching solution for eight gigabit Ethernet ports and a 10-GE link. The FFP provides accelerated packet forwarding and enhanced packet flow through the use of functions such as classification, metering, shaping and re-marking.

Each gigabit port 102 of pGS 100 is associated with a corresponding MAC having an ingress for receiving data packets and an egress for transmitting data packets. Gigabit ports 102 support 10/100/1000 autonegotiation where the MACs operating at 10/100 Mbps support both half and full duplex operation and only full duplex operation at 1000 Mbps.

In one embodiment of the invention each of the gigabit ports 102 can be connected to an internal communications bus, such as a CPS channel. The CPS channel is actually three separate channels, referred to as a C-channel, a P-channel and a S-channel. The C-channel can be 128 bits wide, and can run at 132 MHz. Packet transfers between ports occur on the C-channel. Since this channel is used for data transfer, there is no overhead associated with its use. The P-channel or protocol channel is synchronous or locked with the C-channel. During data transfers, the message header is sent via the P-channel. The P-channel can be 32 bits wide and can run at 132 MHz. The S or sideband channel runs at 132 MHz, and is 32 bits wide. The S-channel is used for functions such as for conveying Port Link Status, receive port full, port statistics, ARL table synchronization, memory and register access to CPU and other CPU management functions, and global memory full and common memory full notification.

Arbitration for the CPS channel occurs out of band. The CPS channel is monitored by each of the gigabit ports 102, and matching destination ports respond to appropriate transactions. C-channel arbitration is a demand priority round robin arbitration mechanism. If no requests are active, however, the default module, which can be selected during the configuration of pGS 100 can park on the channel and have complete access thereto. If all requests are active, the configuration of pGS 100 is such that a Pipeline Memory Management Unit (PMMU) is granted access every other clock cycle, and gigabit ports 102 share equal access to the C-channel on a round robin basis. The PMMU and gigabit ports 102 alternate access, and the PMMU gains access every other cycle.

A plurality of messages can be placed on the protocol P-channel in order to properly direct flow of data flowing on the C-channel. Since the P-channel can be typically 32 bits wide, and a message typically requires 128 bits, four smaller 32 bit messages are put together in order to form a complete P-channel message. The following list identifies some of the fields and functions and the various bit counts of the 128 bit message on the P-channel. These are explanatory in nature and not intended to be limiting.

Opcode—2 bits long—Identifies the type of message present on the C channel 81;

IP Bit—1 bit long—This bit is set to indicate that the packet is an IP switched packet;

IPX Bit—1 bit long—This bit is set to indicate that the packet is an IPX switched packet;

Next Cell—2 bits long—A series of values to identify the valid bytes in the corresponding cell on the C channel 81;

SRC DEST Port—6 bits long—Defines the port number which sends the message or receives the message, with the interpretation of the source or destination depending upon Opcode;

Cos—3 bits long—Defines class of service for the current packet being processed;

J—1 bit long—Describes whether the current packet is a jumbo packet;

S—1 bit long—Indicates whether the current cell is the first cell of the packet;

E—1 bit long—Indicates whether the current cell is the last cell of the packet;

CRC—2 bits long—Indicates whether a Cyclical Redundancy Check (CRC) value should be appended to the packet and whether a CRC value should be regenerated;

P Bit—1 bit long—Determines whether MMU should Purge the entire packet;

Len—7 bytes—Identifies the valid number of bytes in current transfer;

2 bits—Defines an optimization for processing by the CPU 52; and

Bc/Mc Bitmap—28 bits—Defines the broadcast or multicast bitmap. Identifies egress ports to which the packet should be set, regarding multicast and broadcast messages.

Untag Bits/Source Port—28/5 bits long—Depending upon Opcode, the packet is transferred from Port to MMU, and this field is interpreted as the untagged bit map. A different Opcode selection indicates that the packet is being transferred from MMU to egress port, and the last six bits of this field is interpreted as the Source Port field. The untagged bits identifies the egress ports which will strip the tag header, and the source port bits identifies the port number upon which the packet has entered the switch;

U Bit—1 bit long—For a particular Opcode selection (0×01, this bit being set indicates that the packet should leave the port as Untagged; in this case, tag stripping is performed by the appropriate MAC;

CPU Opcode—18 bits long—These bits are set if the packet is being sent to the CPU for any reason. Opcodes are defined based upon filter match, learn bits being set, routing bits, destination lookup failure (DLF), station movement, etc;

Time Stamp—14 bits—The system puts a time stamp in this field when the packet arrives, with a granularity of 1 μsec.

The opcode field of the P-channel message defines the type of message currently being sent. While the opcode is currently shown as having a width of 2 bits, the opcode field can be widened as desired to account for new types of messages as may be defined in the future.

An early termination message is used to indicate that the current packet is to be terminated. During operation, as discussed in more detail below, the status bit (S) field in the message is set to indicate the desire to purge the current packet from memory. Also in response to the status bit all applicable egress ports would purge the current packet prior to transmission.

The Src Dest Port field of the P-channel message, as stated above, define the destination and source port addresses, respectively. Each field is 6 bits wide and therefore allows for the addressing of sixty-four ports.

The CRC field of the message is two bits wide and defines CRC actions. Bit 0 of the field provides an indication whether the associated egress port should append a CRC to the current packet. An egress port would append a CRC to the current packet when bit 0 of the CRC field is set to a logical one. Bit 1 of the CRC field provides an indication whether the associated egress port should regenerate a CRC for the current packet. An egress port would regenerate a CRC when bit 1 of the CRC field is set to a logical one. The CRC field is only valid for the last cell transmitted as defined by the E bit field of P-channel message set to a logical one.

As with the CRC field, the status bit field (st), the Len field, and the Cell Count field of the message are only valid for the last cell of a packet being transmitted as defined by the E bit field of the message.

Last, the time stamp field of the message has a resolution of 1 μs and is valid only for the first cell of the packet defined by the S bit field of the message. A cell is defined as the first cell of a received packet when the S bit field of the message is set to a logical one value.

As is described in more detail below, the C channel and the P channel are synchronously tied together such that data on C channel is transmitted over the CPS channel while a corresponding P channel message is simultaneously transmitted.

The S channel is a 32-bit wide channel which provides a separate communication path within the pGS 100. The S channel is used for management by a Central Processing Unit (CPU), pGS 100 internal flow control, and pGS 100 inter-module messaging. The S channel is a sideband channel of the CPS channel, and is electrically and physically isolated from the C channel and the P channel. It is important to note that since the S channel is separate and distinct from the C channel and the P channel, operation of the S channel can continue without performance degradation related to the C channel and P channel operation. Conversely, since the C channel is not used for the transmission of system messages, but rather only data, there is no overhead associated with the C channel and, thus, the C channel is able to free-run as needed to handle incoming and outgoing packet information.

The S channel of the CPS channel provides a system wide communication path for transmitting system messages throughout pGS 100.

The message format for an S channel message on an S channel can be formed of four 32-bit words. The bits of the fields of the words are defined as follows:

Opcode—6 bits long—Identifies the type of message present on the S channel;

Dest Port—6 bits long—Defines the port number to which the current S channel message is addressed;

Src Port—6 bits long—Defines the port number of which the current S channel message originated;

COS—3 bits long—Defines the class of service associated with the current S channel message; and C bit—1 bit long—Logically defines whether the current S channel message is intended for the CPU 52.

Error Code—2 bits long—Defines a valid error when the E bit is set;

DataLen—7 bits long—Defines the total number of data bytes in the Data field;

E bit—1 bit long—Logically indicates whether an error has occurred in the execution of the current command as defined by opcode;

Address—32 bits long—Defines the memory address associated with the current command as defined in opcode;

Data—0–127 bits long—Contains the data associated with the current opcode.

With the configuration of the CPS channel as explained above, the decoupling of the S channel from the C channel and the P channel is such that the bandwidth on the C channel can be preserved for cell transfer, and that overloading of the C channel does not affect communications on the sideband channel.

Figure 2:
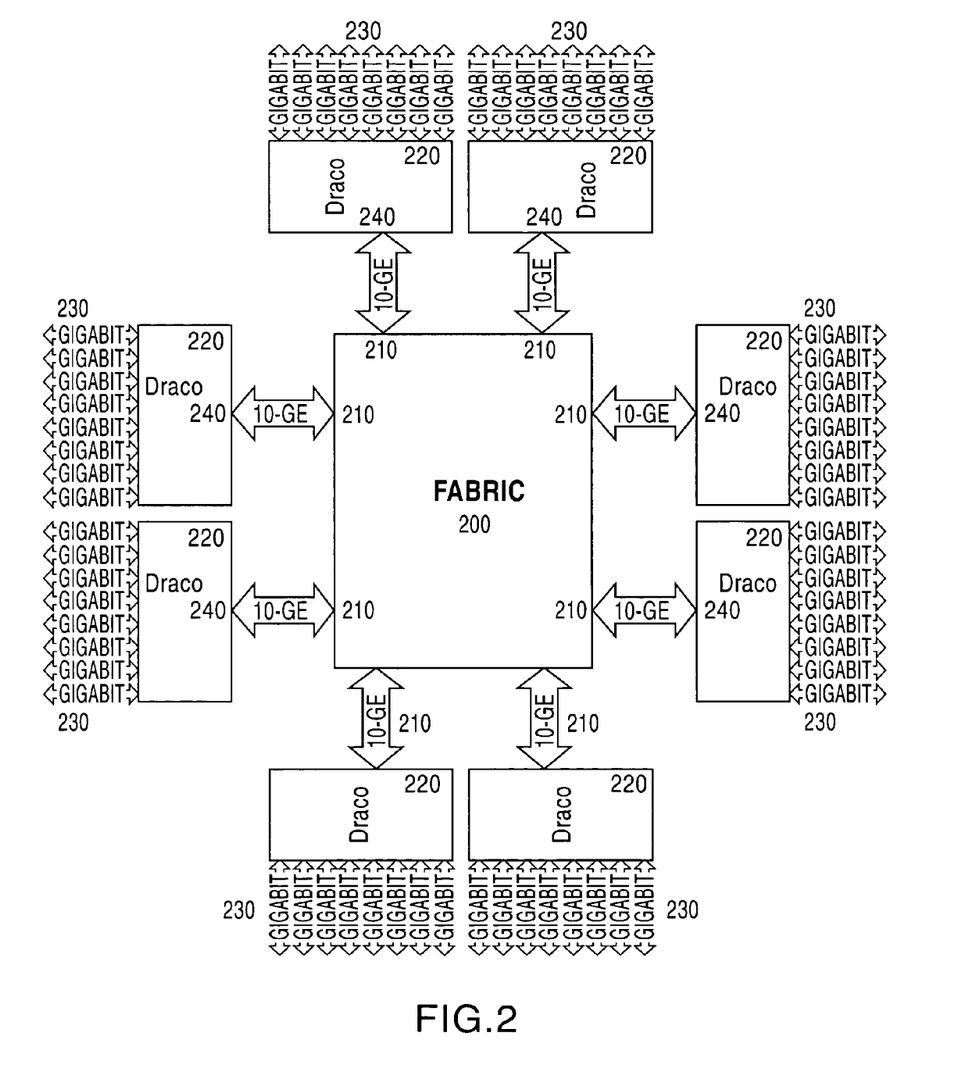
FIG. 2 is an illustration of eight gigabit switches connected to one another through a fabric interface.

FIG. 2 is an is an illustration of an fGS fabric 200. An fGS fabric provides for interconnections among devices. In this example fGS fabric 200 has eight 10-GE (GigabitEthernet) interfaces 210. Each of the eight pGS switches 220 each have eight gigabit ports 230 and a 10-GE interface 240. Each of the eight pGS switches 220 are interconnected to one another through fGS fabric 200. Each of the 10-GE interfaces 240 of each of the pGS switches 220 are connected to an associated 10-GE interface 210 of fGS fabric 200. In this way the eight pGS switches 220 are interconnected through fGS fabric 200 by the 10-GE interfaces provided on each of the pGS switches 220 and the fGS fabric 200.

Figure 3:
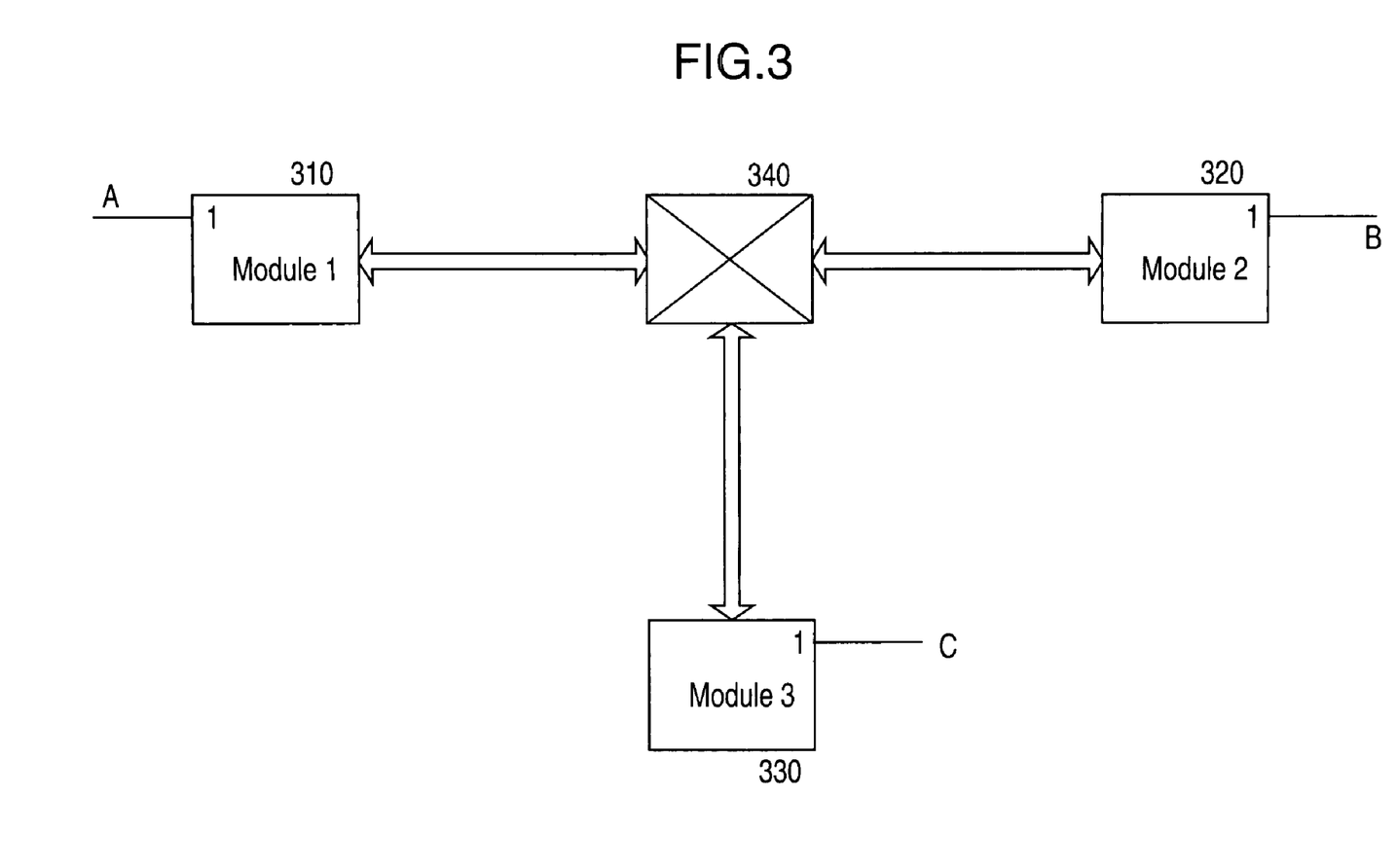
FIG. 3 is an illustration three modules connected to one another through a fabric interface.

FIG. 3 is a block diagram of three modules or switches 310, 320 and 330. Each of the modules 310, 320 and 330 can be a pGS switch as illustrated in FIG. 2 having a plurality of ports used to transfer data packets. A fabric 340 connects each of the modules 310, 320 and 330 to one another as illustrated in FIG. 2 using 10-GE interfaces.

In the example illustrated in FIG. 3 an address A is associated with Port 1 of Module 1, Address B is associated with Port 1 of Module 2 and Address C is associated with Port 1 of Module 3. As discussed previously a packet has a source address and a destination address. If a packet is received in Port 1 of Module 2 and is destined for Address A, Module 2 will send the packet to Module 1 and Module 3 in order to determine which port is the correct port. Module 2 must send the packet to all modules since Module 2 has no information to determine which port on which module is used to transmit a packet to Address A.

In order to speed up processing it is advantageous to implement a way for each of the modules to know which ports on which modules are associated with specific addresses. This can be referred to address "learning". Once a module learns an address the module can forward the packet directly to the proper port on the proper module without sending the packet to all modules and ports.

One way to learn an address is to send a copy of a packet to a Central Processing Unit (CPU). The CPU can in turn formulate a control packet and send the control packet to other modules. An acknowledgement based system can be implemented so that the sending module knows that a given address is learned on all modules. If an acknowledgement is not received from all modules, then the CPU can send the control packet to those modules from which the CPU did not receive an acknowledgement from. This can be accomplished through either hardware or software or a combination of both.

In one embodiment of the invention, in order to avoid the difficulties of acknowledgement based system such as complex implementation and difficulties in verifying in silicon, a system can be implemented so that the hardware provides assistance for learning in the ARL table in addition to the CPU is used to learn and verify address such as MAC addresses. The mechanism is simple to implement, less complex to design and will speed up the address learning process.

Figure 4A:
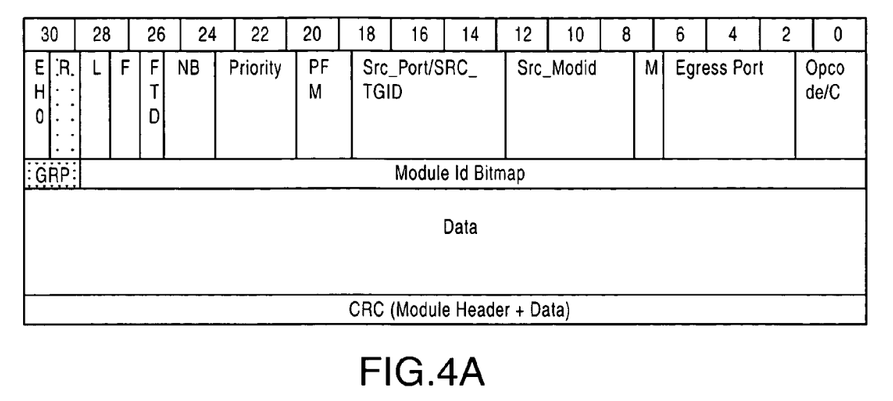
FIG. 4A is an illustration of a module header format
Figure 4B:
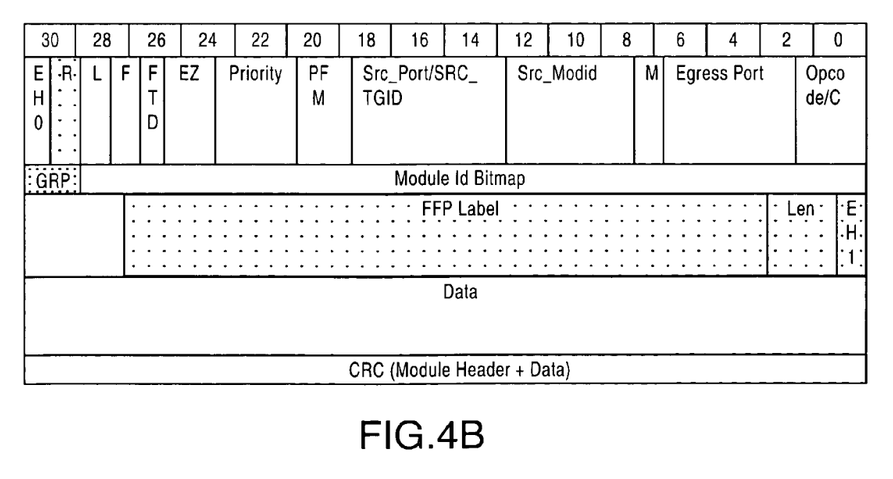
FIG. 4B is an illustration of an extended module header format

The basic system that can be used to communicate control information from one switch or module to another switch or module can be through the use of a module header. The module header can be appended to the front of a packet and the receiving module will decode the module header and take appropriate action. FIG. 4A is an illustration of a basic module header format and FIG. 4B is an illustration of an extended module header. The following list identifies the fields and functions and the various bit counts of a basic module header.

Opcode/C—3 bits long—Identifies the packet type;

Src_Port/SRC_TGID—6 bits long—Indicates if a port is a source port or a trunk port;

M Bit—1 bit long—Identifies if MT Module ID is valid;

Module Id Bitmap—32 bits long—Bitmap of all modules, which are supposed to receive a packet;

Egress Port—6 bits long—Identifies the port number on a remote module, which is supposed to receive a packet;

PFM—2 bits long—Port filtering mode for the source port;

Source Mod Id—5 bits long—Identifies the source module Id of a packet;

Data—N bits long—Indicates the number of bytes in the incoming packet not including the CRC;

CRC Of (Module Header+Data)—32 bits long—CRC value including the data and the Module Header;

F—1 bit long—Indicates if a destination address has been learned;

L—1 bit long—Indicates when a source address needs to be learned;

NB—1 bit long—Indicates when a module header is generated by another vendor;

FTD—1 bit long—Indicates when a device can drop a packet;

GRP—2 bits long—Identifies whether in normal mode or group mode; and

EH0—1 bit long—Identifies if there is a basic header format.

The following is a list of fields in the extended module header format as depicted in FIG. 4B.

EH1—1 bit long—Indicates if there is an additional extended module header;

Len—3 bits long—Indicates the length of the extended module header; and

FFP label—24 bits long—An FFP label transmitted by source module.

The Opcode/C field of the Module Header is 3 bits long and identifies packet type. If the field has a value of 0, this value identifies the frame as a Control Frame which is sent to a Control Processor. If the field has a value of 1, the packet is a unicast packet and the egress port is identified by a unique Module ID Bitmap (only one bit will be set in this field) and the egress port number. If the field has a value of 2, there is a DLF for the packet address and therefore the packet must be sent to multiple ports on the same module or multiple ports on different modules. If the field has a value of 3, the packet is identified as a multicast packet. If the field has a value of 4, the packet is identified as broadcast and is destined to multiple ports on the same module or multiple ports on different modules. If the field has a value of 5, a mirroring function needs to be performed if the M bit is set in the module header. If the filed has a value of 6, this indicates that a packet is destined to the processor fabric. When this Opcode value is used the module id bitmap represents the module id of the fabric.

The source port of a packet is indicated when the most significant bit of the Src_Port/SRC_TGID field is set. If the most significant bit is not set the source port is a trunk group and the field value is the TGID of the trunk group.

When the M Bit is set mirroring has been activated and the MT Module ID becomes a valid field.

The F and L bits are used for address learning. When the F Bit is set it is used for address learning. When a packet is received in the destination module with the F Bit set, an S-Channel message to the ARL will be generated to clear the L_State bit associated with the destination MAC address of a packet. When the L Bit is set, an S-Channel message to the ARL will be generated to learn the source MAC address of a packet.

The FTD field is a First-To-Drop Bit that indicates that a receiving device can drop a packet if there is congestion.

The GRP field indicates which operating mode the device in. In mode 1 or normal mode all bits in the module id bitmap are interpreted as module id's. In mode 2 or group mode, the upper two bits of the module id are interpreted as a group number and the lower thirty bits are interpreted module id's.

If the EH0 bit is set to zero this indicates that it is in basic header module format. If the EH0 bit is set to 1 then this indicates that the is an extended module header.

The EH1 filed of the extended module header indicates whether there is an additional module header. If the EH1 bit is set then there is an additional module header. If the EH1 bit is not set then there is no additional module header.

The LEN field of the extended module header indicates the length of the extended module header. This can be done in two byte segments (i.e. granularity of 2 bytes). The maximum length of an extended module header can be sixteen bytes.

The FFP label can be used so that it can be picked up from a rules table upon a full match.

As discussed above the F and L Bits are provided in the header to assist in address learning. When a source module learns an address, an IPIC can set the L bit in the module header by generating an S-Channel message to the ARL logic to learn the source address of a packet. The packet will then be sent to the destination. If the destination address is found in the ARL table and destination port is resolved the F Bit is set to zero indicating that the destination address has been learned. Otherwise the F bit is set to one indicating a destination lookup failure in the source module.

Figure 5:
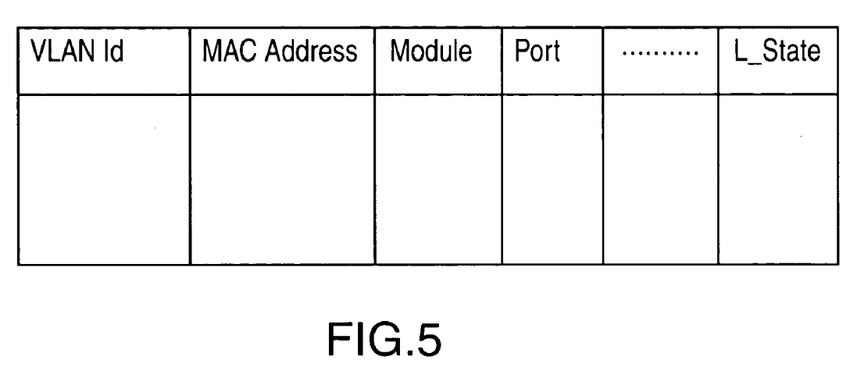
FIG. 5 is an illustration of an ARL Table.

When a packet is received in a destination module, if the L bit is set, then the source MAC address of the packet is learned along with the source port number or the trunk group id which is present in the module header. In addition if the F Bit is set, this indicated that the destination address was not found in the source module. In each module, a state information, L_State, is maintained for each address that is present in an ARL table as depicted in FIG. 5. When a source address is learned in a module it will set the L_State bit to zero, indicating that the packet was sent to all other modules (defined by VLAN) for address learning purposes. If a packet is received the next time with the F Bit set to one in the module header for that particular MAC address, the L_State Bit is set. If after a source lookup, the address is found but the L_State Bit is zero, the packet is sent to all the modules with the L Bit set in the module header as explained above.

The above mechanism in some cases will only be applicable for a unicast packet and for address learning. CPU manipulation in some cases can be expected for the following: 1) Address Delete, 2) Station Movement, 3) L3 Address Learning, 4) Multicast address learning and delete.

Address learning as discussed above can be implemented as follows. When an address is learned in the source module, the ingress will clear the L_State Bit in the ARL Table. This will also be indicated to the IPIC port by setting the LP Bit in the P-Channel. The IPIC logic will pick up the LP Bit from the P-Channel header and set that as the value for the L Bit in the module header before sending the packet to other modules.

When the packet arrives at an ingress port and if the address is already learned in the ARL Table, the LP Bit in the P-Channel will be set to zero. A DA lookup will be performed and if the VID+MAC address is not found in the table, the ingress logic will set the FP bit in the P-Channel. The IPIC logic will pick up the FP Bit from the P-Channel header and set that as the value for the F Bit in the module header before sending the packet to other modules.

When a packet arrives at the destination module or the ingress to the IPIC, if the L bit is set in the module header, the IPIC will generate an S-Channel message to learn the source address of the packet to the ARL logic. If the F Bit is set in the module header, the IPIC will generate an S-Channel message to the ARL logic. The ARL logic will set the L_State Bit for entries associated with the destination MAC address in the packet if that module is the owner of the MAC address.

Aging of the entries can be done by the owner and learned addresses will be eliminated if certain condition are met. For example an entry may be eliminated because of inactivity or non-use.

From the above it is evident that address learning can be accomplished through the use of three indicators. In one example the indicator can be bits or fields located in the module header and ARL tables. As discussed above, the L_State Bit in the ARL table and the L and F Bits in the module header are utilized for address learning. The L Bit is used to indicate when a source address needs to be learned. The F Bit is used to indicated when a destination address has been learned. The L_State Bit is used to indicate when a source address has not been learned.

The L Bit is set if the source address is not found in the ARL table and must be learned.

The F Bit is set when there is a destination lookup failure. Simply stated, the F Bit is set when the destination address is not found in the ARL table.

The L_State Bit is set if the F Bit is set before a destination lookup, there is no destination lookup failure and the address is at the originating switch or module.

In order to more full understand the operation of the invention and the use of the indicators as explained above several examples are described below with reference to FIG. 3. Stations A, B and C reside on port 1 of modules 1, 2 and 3 and all ports belong to the same VLAN, VID=1.

EXAMPLE 1

In this first example Station A in Module 1 sends a packet which is destined for Station B on port 1 in Module 2. Port 1 in Module 1 receives the packet. Since the source address A is not learned in the ARL Table of Module 1, the address is learned and the L Bit is set in the module header. A Destination Address (DA) lookup is then performed and since B is not present there is a Destination Address Lookup Failure (DLF). Since there is a DLF the F Bit is set, the L_State is set to zero and the packet will be sent to all modules. The status of the fields in the ARL Table, L Bit and F Bit for Module 1 are as follows.

| MODULE 1 | |
|---|---|
| MAC Address | 1 |
| Module | 1 |
| VID | 1 |
| Port | 1 |
| L_State | 0 |
| L Bit | 1 |
| F Bit | 1 |

The packet is then sent to Modules 2 and 3. When the packet is received in Module 2 the source address is learned since the L Bit is set. The L_State Bit is in a "don't care" state since module 2 is not the owner of the packet. A DA lookup is then performed resulting in a DLF. The F Bit remains set since there is a DLF. The status of the fields in the ARL Table, L Bit and F Bit for Module 2 are as follows.

| MODULE 2 | |
|---|---|
| MAC Address | A |
| Module | 1 |
| VID | 1 |
| Port | 1 |
| L_State | X |
| L Bit | 1 |
| F Bit | 1 |

When the packet is received in Module 3, the source is learned in Module 3 since the L Bit is set. The L_State Bit is in a "don't care" state since Module 3 is not the owner. A DA is then performed resulting in a DLF. The F Bit remains set since there is a DLF. The status of the fields in the ARL Table, L Bit and F Bit for Module 3 are as follows.

| MODULE 3 | |
|---|---|
| MAC Address | A |
| Module | 1 |
| VID | 1 |
| Port | 1 |
| L_State | X |
| L Bit | 1 |
| F Bit | 1 |

EXAMPLE 2

This second example is performed after execution of the first example. Therefore the ARL Tables, L Bits and F Bits for each module are in a state as described with relation to Example 1. In this second example Station B on port 1 in Module 2 sends a packet to Station A on port 1 in Module 1. Initially, Station B sends a packet addressed to Station A. Port 1 in Module 2 receives the packet. Since the source address B is not learned in the ARL Table of Module 2, the address is learned and the L Bit is set. A DA lookup is then done and since MAC address A is present in the ARL table the F Bit is set to zero, L_State is set to zero and the packet is only sent to Module 1. The status of the fields in the ARL Table, L Bit and F Bit for Module 2 are as follows.

| MODULE 2 | | |
|---|---|---|
| MAC Address | A | B |
| Module | 1 | 2 |
| VID | 1 | 1 |
| Port | 1 | 1 |
| L_State | X | 0 |
| L Bit | 1 | 1 |
| F Bit | 1 | 0 |

When the packet is received in Module 1 the source address B is learned since the L Bit is set. The L_State Bit is in a "don't care" state since it is not the owner. The module header indicates that the packet is to be sent to port 1. The status of the fields in the ARL Table, L Bit and F Bit for Module 1 are as follows.

| MODULE 1 | | |
|---|---|---|
| MAC Address | A | B |
| Module | 1 | 2 |
| VID | 1 | 1 |
| Port | 1 | 1 |
| L_State | 0 | X |
| L Bit | 1 | 1 |
| F Bit | 1 | 0 |

EXAMPLE 3

This third example is independent of the first two examples. In this example Station A on port 1 in Module 1 sends a packet to Station B on port 1 in Module 2 where each of the modules has learned address A and address B has been learned on Modules 2 and 3 but not on Module 1. The ARL Tables, L Bits and F Bits for each module are as follows.

| MODULE 1 | | |
|---|---|---|
| MAC Address | A | |
| Module | 1 | |
| VID | 1 | |
| Port | 1 | |
| L_State | 0 | |
| L Bit | 0 | |
| F Bit | 0 | |
| MODULE 2 | | |
| MAC Address | A | B |
| Module | 1 | 2 |
| VID | 1 | 1 |
| Port | 1 | 1 |
| L_State | X | 0 |
| L Bit | 0 | 0 |
| F Bit | 0 | 0 |
| MODULE 3 | | |
| MAC Address | A | |
| Module | 1 | |
| VID | 1 | |
| Port | 1 | |
| L_State | X | |
| L Bit | 0 | |
| F Bit | 0 | |

Initially, Station A sends a packet addressed to station B. Port 1 in Module 1 receives a packet. Module 1 does a DA lookup for address B and since address B is not present in the ARL Table there is a DLF. Therefore the F Bit is set and the L_State bit is set to zero. Since the source address is already learned in the ARL Table and the L_State is set to zero, the L Bit is not set. Since the destination address has not been learned the packet is sent to Modules 2 and 3. The status of the fields in the ARL Table, L Bit and F Bit for Module 1 are as follows.

| MODULE 1 | |
|---|---|
| MAC Address | A |
| Module | 1 |
| VID | 1 |
| Port | 1 |
| L_State | 0 |
| L Bit | 0 |
| F Bit | 1 |

When the packet is received in Module 2 a Source Address (SA) lookup is not performed since the L Bit is not set. However, a DA lookup is performed since the F Bit is set. Since address B has already been learned by Module 2, there is no DLF. Since the F Bit was set, there was no DLF and Module 2 is the owner the L_State Bit is set. The packet is then flooded to all ports in Module 2. The status of the fields in the ARL Table, L Bit and F Bit for Module 2 are as follows.

| MODULE 2 | | |
|---|---|---|
| MAC Address | A | B |
| Module | 1 | 2 |
| VID | 1 | 1 |
| Port | 1 | 1 |
| L_State | X | 1 |

-continued

| MODULE 2 | | |
|---|---|---|
| L Bit | 0 | 0 |
| F Bit | 0 | 0 |

When the packet is received in Module 3, no SA lookup is performed since the L Bit is not set. Since the F Bit is set a DA lookup is done and the address is found since address B has been learned by Module 3. However since Module 3 is not the owner the L_State does not change. The status of the fields in the ARL Table, L Bit and F Bit for Module 3 are as follows.

| MODULE 3 | | |
|---|---|---|
| MAC Address | A | B |
| Module | 1 | 2 |
| VID | 1 | 1 |
| Port | 1 | 1 |
| L_State | X | X |
| L Bit | 0 | 0 |
| F Bit | 0 | 0 |

EXAMPLE 4

This fourth example can be performed after execution of the third example. Therefore the ARL Tables, L Bits and F Bits for each module are in a state as described with relation to Example 3. In this fourth and last example Station B on port 1 of Module 2 sends a packet to Station A on port 1 of Module 1. When Module 2 receives the packet an SA lookup shows that the entry is present and the L_State is 1. Therefore the L Bit is set in the Module header. The L_State is then set to zero in the ARL Table. A DA lookup on Module 2 for address A indicates that the packet is to be sent to Module 1. The status of the fields in the ARL Table, L Bit and F Bit for Module 2 are as follows.

| MODULE 2 | | |
|---|---|---|
| MAC Address | A | B |
| Module | 1 | 2 |
| VID | 1 | 1 |
| Port | 1 | 1 |
| L_State | X | 0 |
| L Bit | 0 | 1 |
| F Bit | 0 | 0 |

When Module 1 receives packet 1 the source address B is learned in the ARL Table since the L Bit was set. The status of the fields in the ARL Table, L Bit and F Bit for Module 3 are as follows.

| MODULE 1 | | |
|---|---|---|
| MAC Address | A | B |
| Module | 1 | 2 |
| VID | 1 | 1 |
| Port | 1 | 1 |
| L_State | 0 | X |

-continued

| MODULE 1 | | |
|---|---|---|
| L Bit | 0 | 1 |
| F Bit | 0 | 0 |

Figure 6:
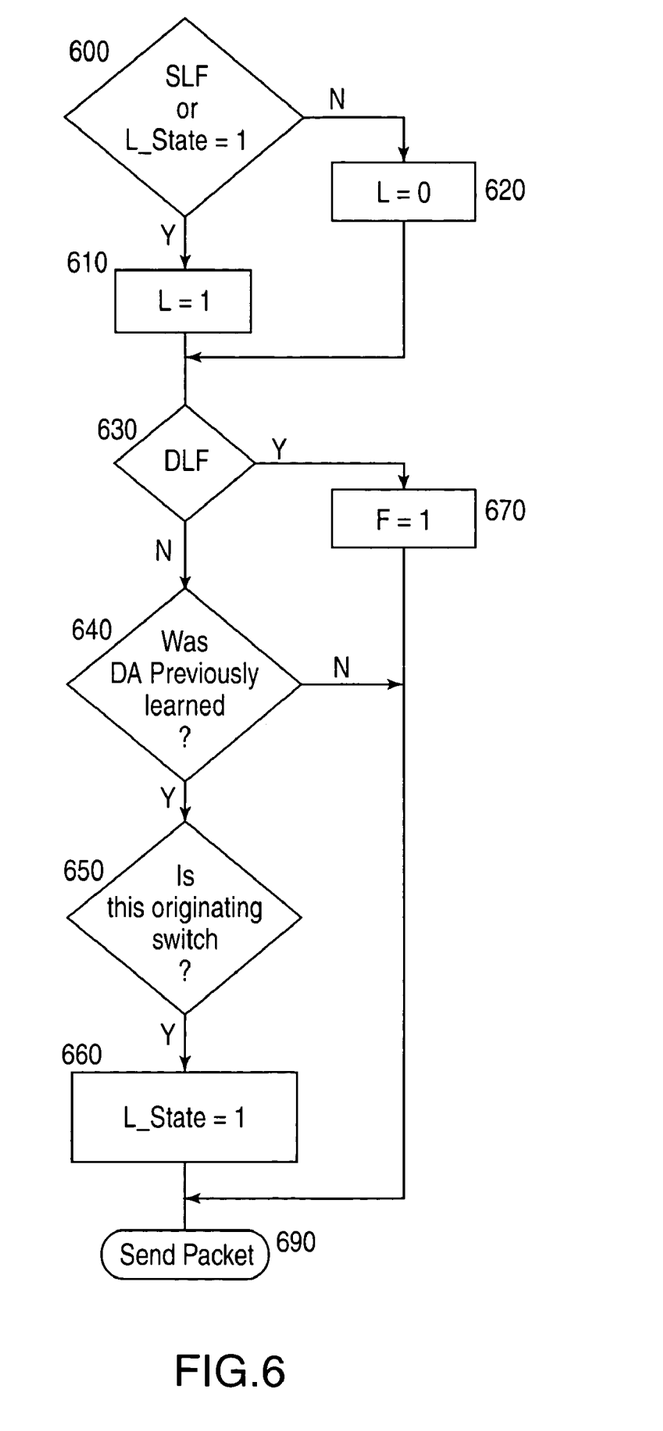
FIG. 6 is a flow diagram of address learning.

FIG. 6 is a flow diagram illustrating steps for implementing address learning. In step 600 an SA lookup is performed and the L_State bit are checked. If the there is an SLF or the L_State bit is set the L Bit is set in step 610. If there is no SLF or if the L_State bit is not set the L_Bit is set to zero in step 620.

In step 630 a DA lookup is performed. If there is no DLF the module checks to see if the DA was previously learned by a previous module in step 640. This can be checked by determining if the F Bit was set when received by the module or switch. If the DA was previously learned and this switch is the originating switch as is checked in step 650, the L_State Bit is set to 1 as illustrated in step 660. By setting the L_State bit to 1, this will indicate that the address still needs to be learned although most of the modules may have already learned the address.

In step 630 if there is a DLF the F Bit will be set in step 670 and will go onto further processing in step 690. Likewise, if the DA was not previously learned in step 640 or the present switch is not the originating switch the packet would go onto further processing in step 690.

The above-discussed configuration of the invention is, in a preferred embodiment, embodied on a semiconductor substrate, such as silicon, with appropriate semiconductor manufacturing techniques and based upon a circuit layout which would, based upon the embodiments discussed above, be apparent to those skilled in the art. A person of skill in the art with respect to semiconductor design and manufacturing would be able to implement the various modules, interfaces, and tables, buffers, etc. of the present invention onto a single semiconductor substrate, based upon the architectural description discussed above. It would also be within the scope of the invention to implement the disclosed elements of the invention in discrete electronic components, thereby taking advantage of the functional aspects of the invention without maximizing the advantages through the use of a single semiconductor substrate.

Although the invention has been described based upon these preferred embodiments, it would be apparent to those of skilled in the art that certain modifications, variations, and alternative constructions would be apparent, while remaining within the spirit and scope of the invention. In order to determine the metes and bounds of the invention, therefore, reference should be made to the appended claims.

We claim:

1. A switch using indicators for address learning comprising:
    a first activator configured to control a first indicator to indicate when a source address needs to be learned and when a source address has been learned;
    a second activator configured to control a second indicator to indicate when a destination address has not been learned and when a destination address has been learned; and
    a third activator configured to control a third indicator to indicate when a source address has not been learned in all switches.

2. The switch as recited in claim 1 wherein said second activator is configured to set the second indicator when there is a destination address lookup failure.

3. The switch as recited in claim 1 wherein said third activator is configured to set the third indicator if the second indicator is set before a destination address lookup, there is no destination address lookup failure and the address originated from the switch.

4. The switch as recited in claim 1 wherein said first activator configured to set the first indicator if there is a source address lookup failure or if the third indicator has been activated.

5. The switch as recited in claim 1 wherein:
said first activator is configured to set the first indicator in a header if there is a source address lookup failure or if the third indicator has been activated; and
said second activator is configured to set the second indicator in a header when there is a destination address lookup failure.

6. The switch as recited in claim 1 wherein said third activator is configured to set the third indicator in an ARL Table if the second indicator is set before a destination address lookup, there is no destination address lookup failure and the address originated from the switch.

7. The switch as recited in claim 1 further comprising an address learner configured to learn an address when said first indicator is set.

8. The switch as recited in claim 1 further comprising an address learner configured to learn an address by storing information of an address in an ARL table.

9. A switch for address learning comprising:
an first indicator means for indicating when a source address needs to be learned and when a source address has been learned;
an second indicator means for indicating when a destination address has not been learned and when a destination address has been learned; and
an third indicator means for indicting when a source address has not been learned in all switches.

10. The switch as recited in claim 9 wherein said second indicator means activates a second indicator when there is a destination address lookup failure.

11. The switch as recited in claim 9 wherein said third indicator means activates a third indicator if the F Bit is set before a destination lookup, there is no destination lookup failure and the address originated from the switch.

12. The switch as recited in claim 11 further wherein said first indicator means activates a second indicator if there is a source address lookup failure or if the third indicator has been activated.

13. The switch as recited in claim 9 further comprising an address learner means for learning an address when said first indicator means indicates that a source address needs to be learned.

14. The switch as recited in claim 9 further comprising an address learner means for learning an address by storing information of an address in an ARL table.

15. A method of address learning comprising the steps of:
receiving a packet in a switch;
performing a destination address lookup;
setting a first indictor if there is a destination address lookup failure;
setting a second indicator if the first indicator was set before the destination address lookup, there is no destination lookup failure, and the switch is the originating switch;
performing a source address lookup;
setting a third indicator if there is a source address lookup failure or if said second indicator is set; and
learning an address if said third indicator is set.

16. The method as recited in claim 15 wherein said first indicator and said third indicator are set in a header.

17. The method as recited in claim 15 wherein said second indicator is set in an ARL Table.

* * * * *